United States Patent
Schiffbauer et al.

(10) Patent No.: US 6,870,106 B1
(45) Date of Patent: Mar. 22, 2005

(54) FLEXIBLE TELECOMMUNICATIONS CABLE FOR OUTSIDE PLANT EQUIPMENT

(75) Inventors: Robert Schiffbauer, Olathe, KS (US); Hans Marosfalvy, Lenexa, KS (US); Randall D. Hutchison, Shawnee, KS (US); Tomasz Taubert, Overland Park, KS (US); Kevan Smith, Overland Park, KS (US)

(73) Assignee: Special Product Company, Overland Park, KS (US)

( * ) Notice: Subject to any disclaimer, the term of this patent is extended or adjusted under 35 U.S.C. 154(b) by 0 days.

(21) Appl. No.: 10/452,652

(22) Filed: Jun. 2, 2003

Related U.S. Application Data

(60) Provisional application No. 60/386,352, filed on Jun. 5, 2002.

(51) Int. Cl.[7] .............................................. H02G 15/02
(52) U.S. Cl. ...................................... 174/74 R; 174/78
(58) Field of Search ............................ 174/70 S, 16 HS, 174/74 R, 78, 84 R, 92, 93; 361/704, 700, 702; 439/607, 608, 610

(56) References Cited

U.S. PATENT DOCUMENTS

| | | | | |
|---|---|---|---|---|
| 5,380,224 A | * | 1/1995 | DiCicco | 439/610 |
| 5,536,185 A | * | 7/1996 | Guiol | 439/610 |
| 5,586,911 A | * | 12/1996 | Miller et al. | 439/607 |
| 5,718,608 A | * | 2/1998 | Guiol | 439/610 |
| 6,118,662 A | * | 9/2000 | Hutchison et al. | 361/704 |
| 6,211,459 B1 | * | 4/2001 | O'Groske et al. | 174/36 |
| 6,430,044 B2 | | 8/2002 | Hutchinson et al. | |

* cited by examiner

*Primary Examiner*—William H. Mayo, III
(74) *Attorney, Agent, or Firm*—Hovey Williams LLP

(57) ABSTRACT

A telecommunications cable section (12) for connection with telecommunications or signaling equipment or other outside plant equipment, wherein the cable section (12) comprises a plurality of conductors (30) surrounded by an intermediate layer of corrugated material (32). A flexible braided or mesh protective sheathing (34) substantially surrounds the intermediate layer (32). The braided sheathing (34) is preferably a braided or mesh sock or tubular sleeve or sleeve of copper or other metal or material. An exterior layer of substantially moisture-proof shrinkable tubing (36) substantially surrounds the braided sheathing (34).

10 Claims, 5 Drawing Sheets

FLEXIBLE TELECOMMUNICATIONS CABLE FOR OUTSIDE PLANT EQUIPMENT

RELATED APPLICATIONS

The present application claims priority benefit, with regard to all common subject matter, of an earlier-filed U.S. provisional patent application titled "FLEXIBLE TELECOMMUNICATIONS CABLE FOR OUTSIDE PLANT EQUIPMENT", Ser. No. 60/386,352, filed Jun. 5, 2002. The identified earlier-filed provisional application is hereby incorporated by reference into the present application.

BACKGROUND OF THE INVENTION

1. Field of the Invention

The present invention relates to mechanisms and methods for facilitating connection of a telecommunications cable to outside plant equipment. More particularly, the present invention provides a telecommunications cable or cable section for connection with telecommunications or signaling equipment or other outside plant equipment, wherein the cable comprises a braided or mesh protective sheathing, rather than solid metal protective sheathing or armor, that greatly increases the cable's flexibility and facilitates accommodating alignments or orientations of up to approximately 180° between the cable and the outside plant equipment.

2. Description of the Prior Art

In the telecommunications industry, signal transmission equipment located between central offices and between central offices and end users is termed "outside plant" equipment. This equipment is connected to or interfaced with a system or network using cables or other transmission lines. Outside plant equipment may include, for example, telecommunications, signaling, and other electronic equipment housed in protective enclosures which are often mounted on telephone poles above-ground or within subterranean manholes below ground. For example, everincreasing use of wide area networks (WANs), particularly the Internet, and other telecommunication innovations has increased demand for high-speed, high-bandwidth digital telecommunications services, such as ISDN, (X)DSL, and T1, in homes and businesses. Due to signal propagation limitations, these digital services require special electronic equipment, including electronic signal repeaters and doublers, located at or within specific distance intervals from a provider's central office and operable to repeat signals for end-users who would otherwise be outside of the signal propagation limits.

It will be appreciated that such outside plant equipment may be exposed to a harsh environment, and must therefore be designed to withstand both vandalism and natural hazards such as, for example, earthquakes, flooding, extreme hot and cold temperatures, and wildlife. Similarly, the cable connecting the outside plant equipment with a trunk line of the system or network is typically constructed to include a solid metal protective sheathing or armor that substantially protects against the aforementioned hazards and substantially reduces or eliminates electromagnetic interference (EMI).

Unfortunately, solid metal protective sheathing also makes the cable extremely stiff and inflexible. While stiff cable may be useable for long straight runs, it can make connecting to the outside plant equipment extremely difficult. For example, where one of the aforementioned protective enclosures is mounted on a telephone pole, the cable may approach the enclosure from above, for aerial transmission lines, or below, for buried transmission lines, or where the enclosure is mounted in a manhole, the cable may approach the enclosure from virtually any direction. Thus, due to mounting, space, and other constraints, it may be desirable and sometimes necessary to connect the cable to a side or portion of the enclosure that is substantially different from or even opposite the cable's alignment or orientation. This may require bending the cable up to 180° in a very small space. Unfortunately, it is often extremely difficult, time-consuming, and inconvenient or even impossible to bend the extremely stiff cable in a sufficiently tight radius so as to accomplish the connection.

Due to the above-identified and other limitations of the current art, a need exists for an improved cable or mechanism or method for connecting the cable with the outside plant equipment.

SUMMARY OF THE INVENTION

The present invention solves the above-described and other problems and provides a distinct advance in the art of enclosures for telecommunications, signaling, and similar electronic equipment. More particularly, the present invention provides a telecommunications cable or cable section for connection with telecommunications or signaling equipment or other outside plant equipment, wherein the cable comprises a braided or mesh protective sheathing, rather than solid metal protective sheathing or armor, that greatly increases the cable's flexibility and facilitates accommodating alignments or orientations of up to approximately 180° between the cable and the outside plant equipment. Thus, the present invention overcomes the stiffness associated with prior art armored cable without sacrificing electromagnetic interference (EMI) protection, signal shielding, or tensile strength. Additionally, the present invention maintains any pressurization that may be employed to prevent penetration of moisture or fine particles.

The cable broadly comprises a flexible cable section; a cable interface portion; and an enclosure interface portion. The flexible cable section includes one or more internal wire conductors; a corrugated sheathing; a braided or mesh sheathing; and a shrinkable sheathing. The internal wire conductors carry electric signals to or from the outside plant equipment. The corrugated sheathing surrounds and protects the internal wire conductors from potentially damaging environmental conditions and from kinking and other damage that might otherwise occur when the flexible cable section is bent. The braided sheathing substantially surrounds the corrugated sheathing and provides protection against both environmental hazards and EMI. The shrinkable sheathing substantially surrounds and protects the braided sheathing and further protects the internal wire conductors from moisture or fine particles.

The cable interface portion facilitates coupling the flexible cable section with the existing prior art cable section, and broadly includes a first section of adhesive-lined shrinkable tubing and a second section of adhesive-lined shrinkable tubing. The cable interface portion and the prior art cable section are interfaced in such a manner as to ensure a secure coupling, prevent penetration by moisture or fine particles, and maintain any pressurization within the cable.

The enclosure interface portion facilitates coupling the flexible cable section with the outside plant equipment, and broadly includes a strain relief mechanism; a strain relief nut; a cup adapter plate; a cup adapter; a sealing gasket; an O-ring; and an adhesive-lined shrinkable tubing. The strain relief mechanism and strain relief nut cooperate to substantially reduce or eliminate strain experienced by the cable due to bending, flexure, or other movement, thereby protecting against damage or inadvertent disconnection. The sealing gasket and the O-ring substantially reduce or prevent penetration by moisture or fine particles and loss of pressurization. The flexible cable section, the enclosure interface portion, and the outside plant equipment are joined in such a manner as to ensure a secure coupling, prevent penetration by moisture or fine particles, and maintain any pressurization within the cable or outside plant equipment.

Thus, it will be appreciated that the cable of the present invention provides a number of substantial advantages over the prior art, including, for example, replacing the extremely stiff and inflexible solid metal sheathing or armor used in prior art cables with a much more flexible braided or mesh sheathing that is advantageously easier, more convenient, and less labor intensive to bend and therefore facilitates connecting the cable with outside plant equipment.

These and other features of the present invention are more fully described below in the section entitled DETAILED DESCRIPTION OF A PREFERRED EMBODIMENT.

BRIEF DESCRIPTION OF THE DRAWING FIGURES

A preferred embodiment of the present invention is described in detail below with reference to the attached drawing figures, wherein.

DETAILED DESCRIPTION OF A PREFERRED EMBODIMENT

Figures 3, 4:
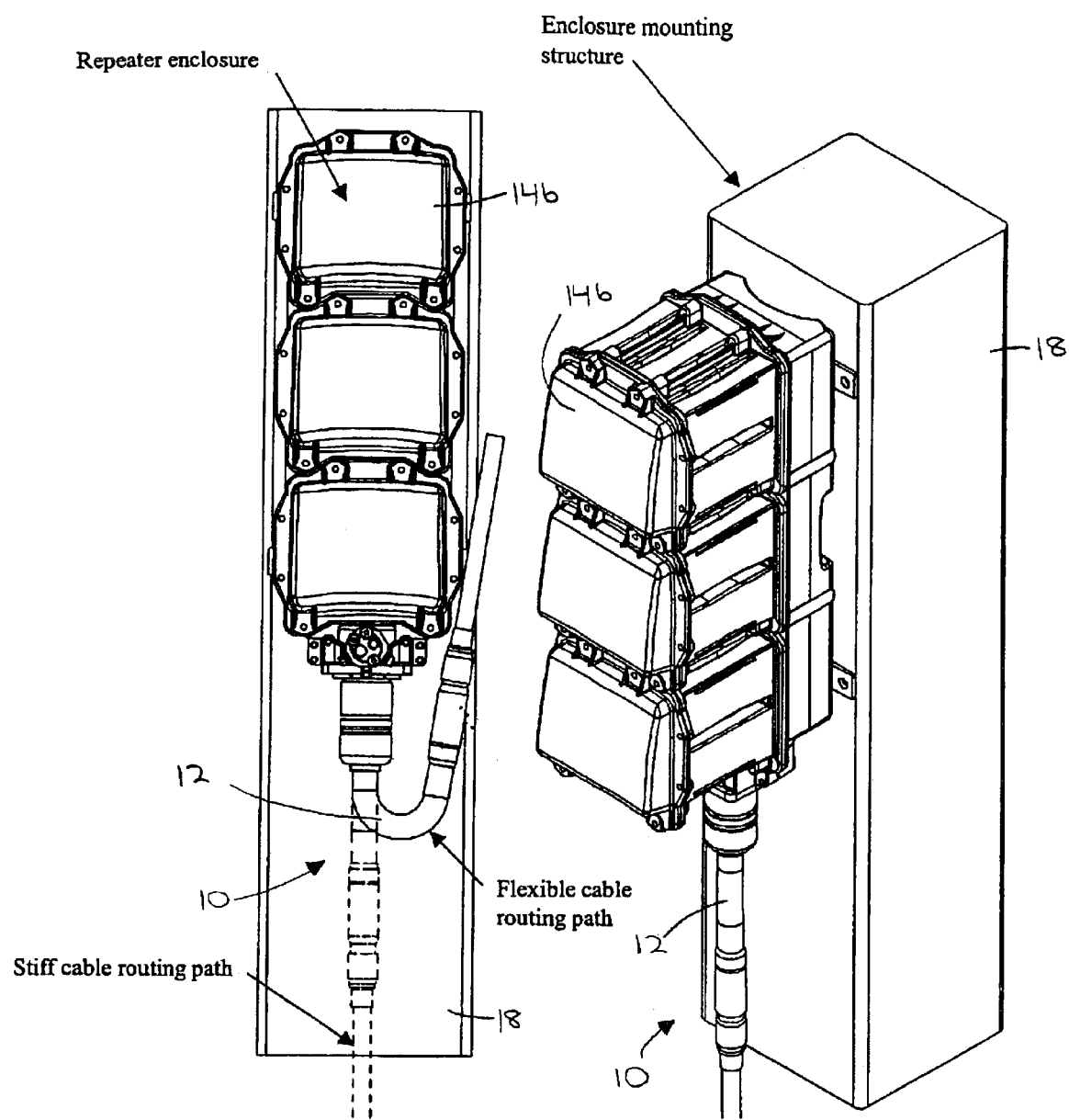
FIG. 3 is an elevation view of the cable connected to a second type of telecommunications equipment enclosure mounted on a column or wall within a manhole, with separate instances of the cable shown in broken line to indicate possible orientations and range of flexibility.
FIG. 4 is an isometric view of the cable and the second type of telecommunications equipment enclosure of FIG. 3.

Referring to the figures, a flexible telecommunications cable 10 is shown constructed in accordance with a preferred embodiment of the present invention. Referring particularly to FIGS. 1–4, the cable 10 includes a substantially flexible cable section 12 that facilitates connection with outside plant equipment such as, for example, a first type of telecommunications equipment enclosure 14a mounted on a telephone pole 16 above-ground (FIGS. 1 and 2), or a second type of telecommunications equipment enclosure 14b mounted on a column or wall 18 in a manhole below ground (FIGS. 3 and 4). One example of the first type of telecommunications equipment enclosure is described in U.S. Pat. No. 6,118,662, titled "Enclosure for Telecommunications Equipment", assigned to Special Product Company of Overland Park, Kans.; one example of the second type of telecommunications equipment enclosure is described in U.S. Pat. No. 6,430,044B2, titled "Telecommunications Enclosure with Individual, Separated Card Holders", also assigned to Special Product Company of Overland Park, Kans. Both of the identified patents are hereby incorporated by reference into the present application. It should be noted, however, that the cable 10 is useable to connect outside plant equipment generally, including signaling and other electronic equipment, and is not limited to telecommunications equipment.

Figures 1, 2:
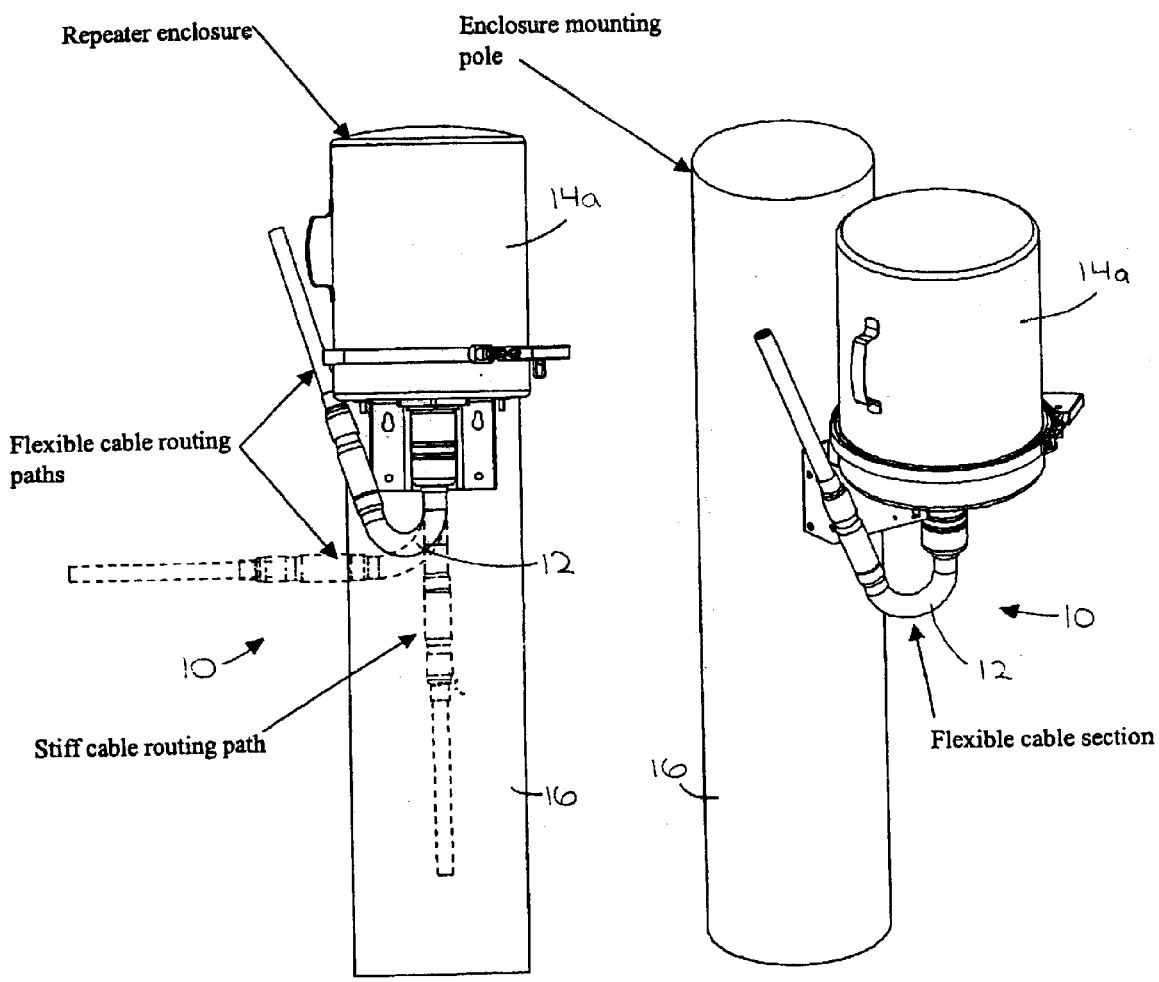
FIG. 1 is an elevation view of a preferred embodiment of the telecommunications cable of the present invention connected to a first type of telecommunications equipment enclosure mounted on a telephone pole, with separate instances of the cable shown in broken line to indicate possible orientations and range of flexibility.
FIG. 2 is an isometric view of the cable and the first type of telecommunications equipment enclosure of FIG. 1.

In both FIGS. 1 and 3, at least two separate instances of the cable 10 are shown in order to illustrate and emphasize the possible orientations and range of motion and flexibility allowed by the cable 10. More specifically, in each figure an instance of the cable 10 is shown in broken line as being perfectly aligned or oriented with the telecommunications equipment enclosure 14a,14b such that no bending of the cable 10 is required in order to make the connection. Prior art cables, having solid, inflexible metal sheathing or armor require such a perfect or near perfect alignment as they cannot be bent, at least not to any great degree, to accommodate any other alignment. In the figures, however, the cable 10 is also shown in solid line as being substantially misaligned with the telecommunications equipment enclosure 14a,14b, but bending as required in order to make the connection. Thus, the cable 10 of the present invention is sufficiently flexible and bendable so as to allow for accommodating substantially any alignment or orientation between 0° and 180°, thereby advantageously facilitating connections that would otherwise be very difficult or impossible to accomplish with prior art cables.

Figure 5:
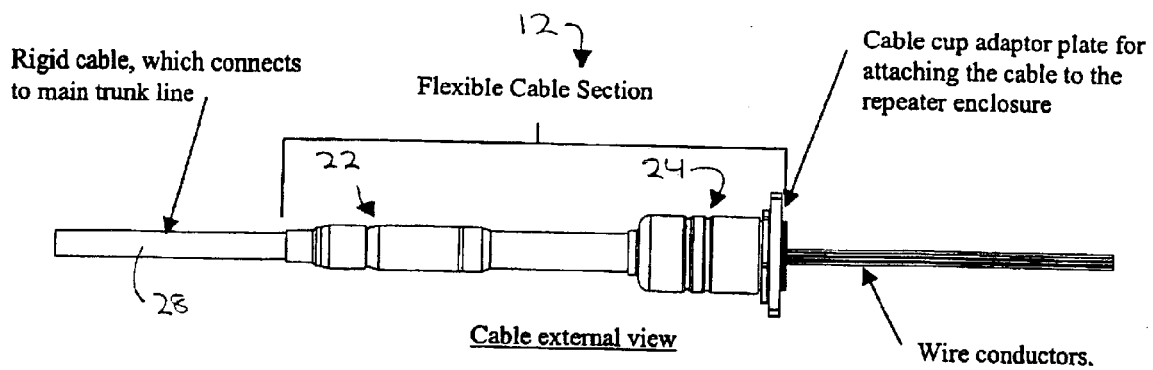
FIG. 5 is a fragmentary elevation view of the cable.
Figure 6:
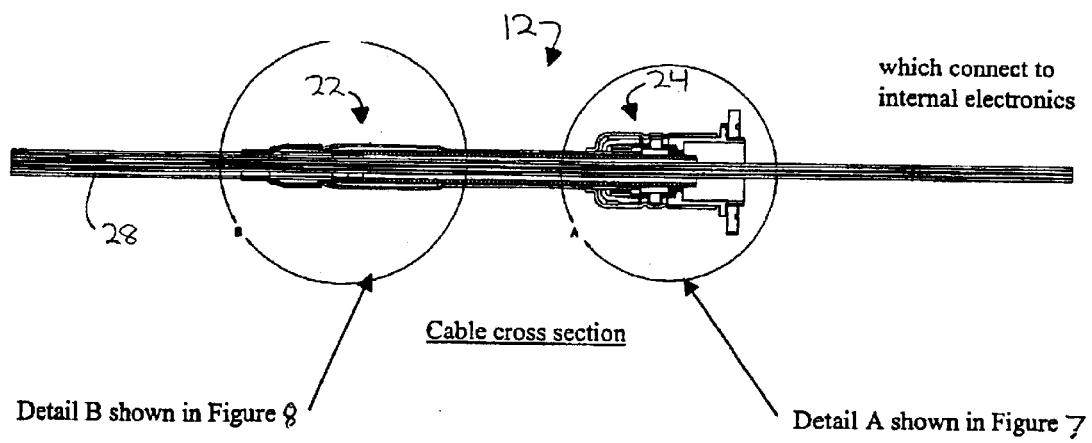
FIG. 6 is a fragmentary cross-sectional view of a flexible section of the cable of FIG. 5.

Referring to FIGS. 5 and 6, the cable 10 broadly comprises the flexible cable section 12; a cable interface portion 22; and an enclosure interface portion 24. In the illustrated embodiment, an existing substantially rigid prior art cable section 28 has been retrofitted with the flexible cable section 12 in order to provide increased flexibility and allow for significant bends. The existing prior art cable section 28 extends between and connects the flexible cable section 12 and a main trunk line of the system or network. In a contemplated alternative embodiment, the substantially rigid prior art cable section 28 is eliminated entirely and the flexible cable section 12 connects directly with the main trunk line.

Figure 7:
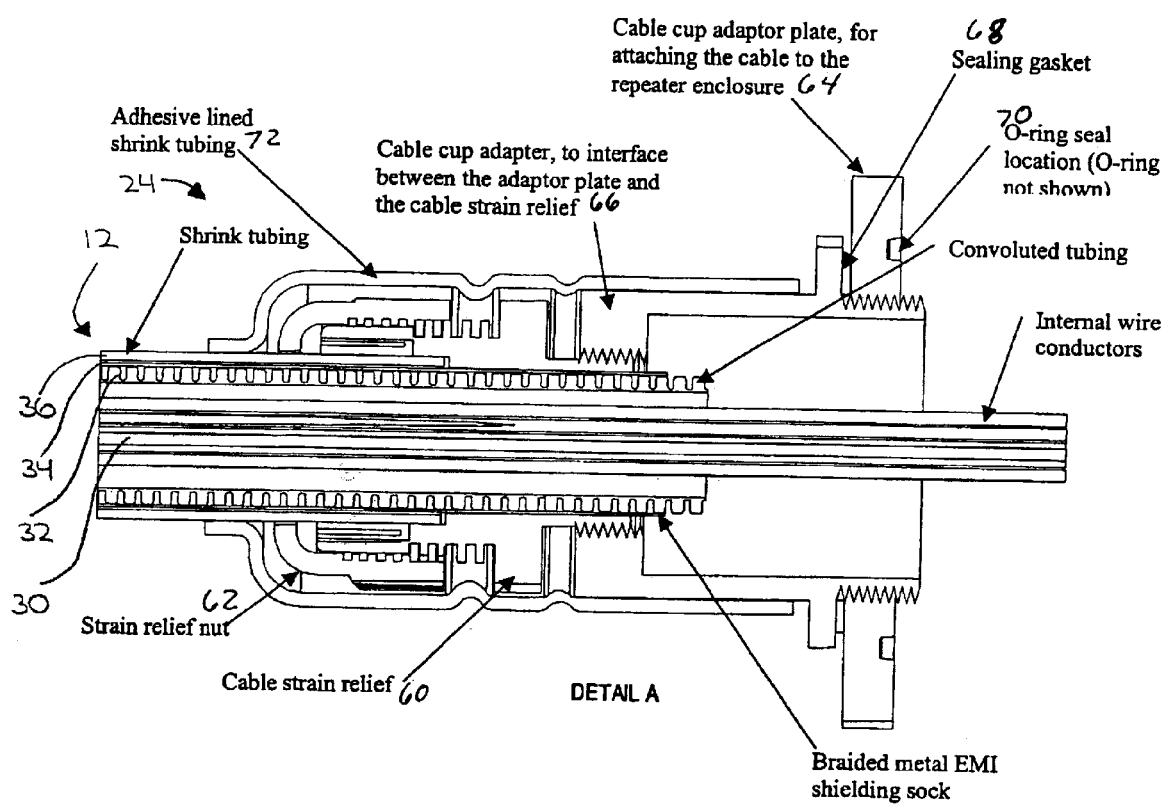
FIG. 7 is a fragmentary cross-sectional view of a first end portion of the flexible section the cable of FIG. 6, including an enclosure interface portion.
Figure 8:
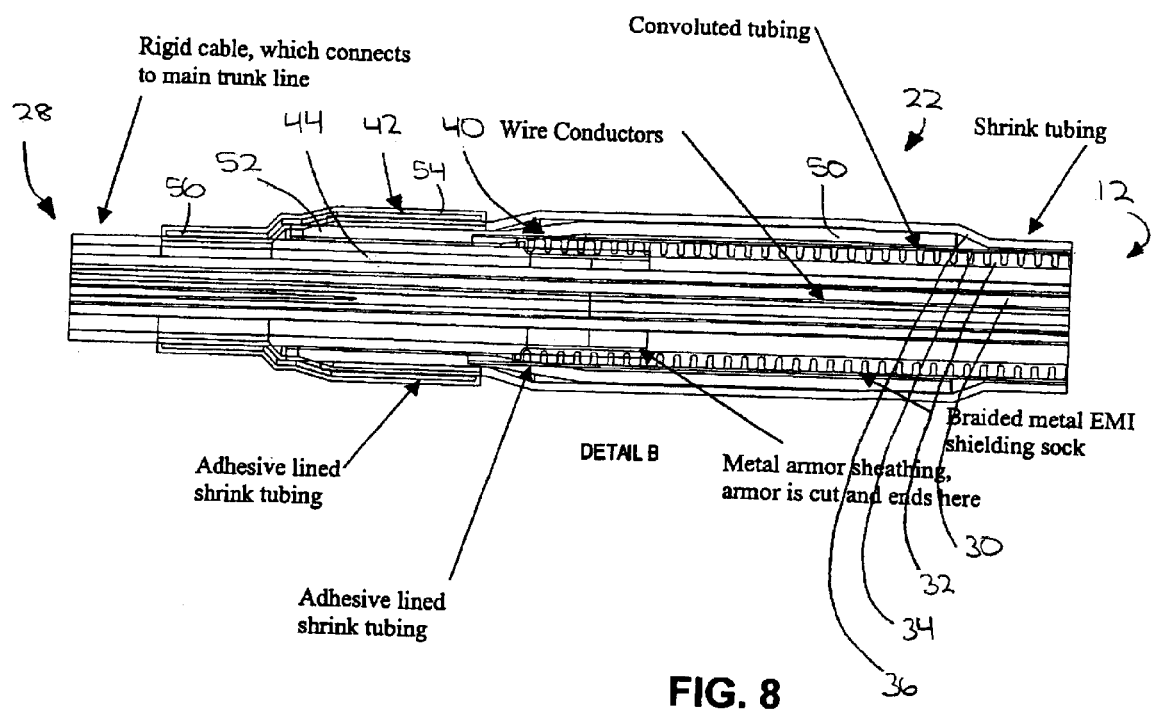
FIG. 8 is a fragmentary cross-sectional view of a second end portion of the flexible section of the cable of FIG. 6, including a cable interface portion.

Referring to FIGS. 7 and 8, the flexible cable section 12 broadly includes one or more internal wire conductors 30; a corrugated sheathing layer 32; a braided or mesh sheathing layer 34; and a shrinkable sheathing layer 36. The internal wire conductors 30 carry electric signals to or from the outside plant equipment. For example, where the cable 10 is connected to one of the aforementioned telecommunications equipment enclosures 14a,14b, the internal wire conductors 30 may carry electrical signals to and from one or more electronic signal repeater or doubler cards protectively housed within the telecommunications equipment enclosure 14a,14b. The internal wire conductors 30 may be twisted to improve the flexibility of and aid in bending multiple conductors.

The corrugated sheathing 32 surrounds and protects the internal wire conductors 30 from potentially damaging environmental conditions. The corrugated sheathing may, for example, be substantially moisture-proof. Also, corrugation substantially prevents this layer of sheathing 32 from collapsing, tearing, or being otherwise damaged when the flexible cable section 12 of the cable 10 is bent, thereby protecting the internal wire conductors 30. Typically, the cable 10 will be pressurized to substantially prevent moisture or fine particles from reaching the internal wire conductors 30 or traveling through the cable 10 and into the telecommunications equipment enclosure 14a,14b. Where the cable 10 is pressurized, the corrugated sheathing 32 also functions to provide a barrier or seal that facilitates maintaining a desired degree of pressurization. The inside diameter of the corrugated sheathing 32 is preferably larger than the outside diameter of the solid metal sheathing 44 (see FIG. 8) of an existing prior art cable section 28. This facilitates coupling or splicing the flexible cable section 12 with the existing prior art cable section 28, as discussed below in greater detail.

The braided sheathing 34 substantially surrounds the corrugated sheathing 32 and provides protection against both environmental hazards and EMI. The braided sheathing 34 is preferably a braided or mesh sock or sleeve or tubular sleeve of one or more tightly woven, multi-strand, soft-drawn wires of copper, tinned copper, silver-plated copper, stainless steel, or other metal, metal alloy, composite material, or other material. The braided sheathing 34 should both protect against penetration (e.g., rodent or other animal teeth) and crushing (e.g., vehicles or other heavy weights or forces) and shield against EMI. The braided sheathing 34 should also be constructed so as to allow for bending or redirecting the flexible cable section 12 to an inside bend radius of as small as approximately between two inches and four inches. Furthermore, the braided sheathing diffuses tensile and other forces experienced by the cable 10, thereby protecting the wire conductors 30 by carrying these forces away from the wire conductors 30. Braided sheathing suitable for use in the present invention is currently available from a number of suppliers, including, for example, Alpha Wire Company; Daburn Electronics and Cable Corporation; or Kabelwerk Eupen AG.

The shrinkable sheathing 36 substantially surrounds and protects the braided sheathing 34 and further protects the internal wire conductors 30 from moisture or fine particles. The shrinkable sheathing 36, as well as the various instances of shrinkable tubing referred to below, may be conventional shrinkable tubing adapted to shrink in diameter when subjected to certain temperatures, chemicals, or other catalysts, and to provide a substantially moisture-proof and dust or particle-proof barrier.

Referring particularly to FIGS. 7 and 8, the cable interface portion 22 facilitates coupling the flexible cable section 12 with the existing prior art cable section 28. The cable interface portion 22 broadly includes a first section of adhesive-lined shrinkable tubing 40 and a second section of adhesive-lined shrinkable tubing 42. When coupling the flexible cable section 12 with the existing prior art cable section 28, the solid metal sheathing 44 of the existing prior art cable section 28 is cut as necessary so as to fit and be received within the corrugated sheathing 32 of the flexible cable section 12. A first end 50 of the first layer of shrinkable tubing 40 of the cable interface portion 22 is inserted between the braided sheathing 34 and the shrinkable sheathing 36 of the flexible cable section 12. A second end 52 of the first layer of shrinkable tubing 36 of the cable interface portion 22 is fitted over the existing prior art cable section 28. A first end 54 of the second layer of shrink tubing 42 is fitted over the second end of the first layer of shrinkable tubing 40. A second end 56 of the second layer of shrinkable tubing 42 is fitted over the existing prior art cable section 28 to reach a point substantially farther down the length of the existing prior art cable section 28 than the second end of the first layer of shrinkable tubing 40, thereby providing an area of overlap. Thus, the cable interface portion 22 substantially ensures a secure coupling of the flexible cable section 12 with the existing prior art cable section 28, while maintaining the integrity of any barrier or seal preventing penetration by moisture or fine particles and maintaining any pressurization.

The enclosure interface portion 24 facilitates coupling the flexible cable section 12 with the telecommunications equipment enclosure 14a,14b or other outside plant equipment. The enclosure interface portion 24 broadly includes a strain relief mechanism 60; a strain relief nut 62; a cup adapter plate 64; a cup adapter 66; a sealing gasket 68; an O-ring 70; and an adhesive-lined shrinkable tubing 72. The strain relief mechanism 60 substantially reduces or eliminates strain experienced by the cable 10 due to bending, flexure, or other movement, thereby protecting against damage or inadvertent disconnection. The strain relief nut 62 adjustably cooperates with the strain relief mechanism 60 to achieve a desired or necessary degree of strain relief.

The cup adapter plate 64 and the cup adapter 66 cooperate to facilitate physically securing the flexible cable section 12 to the telecommunications equipment enclosure 14a,14b. The sealing gasket 68 and the O-ring 70 substantially reduce or prevent penetration by moisture or fine particles into the cable 10 or the telecommunications equipment enclosure 14a,14b or loss of pressurization from the cable 10 or telecommunications equipment enclosure 14a,14b when so coupled.

The adhesive-lined shrinkable tubing 72 is fitted over at least a portion of the strain relief mechanism 60 and the strain relief nut 62 as well as a portion of the flexible cable section 12 itself so as to further reduce or prevent penetration by moisture or fine particles into or loss of pressurization from the cable 10 or telecommunications equipment enclosure 14a,14b.

By way of exemplary illustration and not limitation, use and operation of the cable 10 proceeds as follows. Joining the flexible cable section 12 with the existing prior art cable section 28 is accomplished as described above. It will be appreciated that, as desired, the existing prior art cable section 28 may be eliminated in favor of using the braided or mesh sheathing 34 along the entire length of the cable 10. The flexible cable section 12 is then bent as desired or necessary, up to approximately 180°, in order to properly align or orient with the outside plant equipment and facilitate connection thereto. The cable 10 is then connected to the outside plant equipment, and thereafter functions substantially similar or identical to the existing prior art cable section 28.

From the preceding description it will be appreciated that the cable 10 of the present invention provides a number of substantial advantages over the prior art, including, for example, replacing the extremely stiff and inflexible solid metal sheathing 44 or armor used in the existing prior art cable section 28 with a much more flexible braided or mesh sheathing 34 that is advantageously easier, more convenient, and less labor intensive to bend and therefore facilitates connecting the cable 10 with outside plant equipment.

Although the invention has been described with reference to the preferred embodiment illustrated in the attached drawing figures, it is noted that equivalents may be employed and substitutions made herein without departing from the scope of the invention as recited in the claims. For example, as noted above, the cable 10 of the present invention is substantially independent of the type or nature of the outside plant equipment, which may involve, for example, telecommunications, signaling, or other electronic equipment. Furthermore, though the cable 10 is shown and described herein as including the flexible cable section 12 having the braided or mesh sheathing 34 and the existing prior art cable section 28 section having the solid metal sheathing or armor 44, the existing prior art cable section 28 may be eliminated entirely in favor of a cable that is much more flexible along its entire length.

Having thus described the preferred embodiment of the invention, what is claimed as new and desired to be protected by Letters Patent includes the following:

1. A cable for connecting outside plant equipment to a network, the cable including a flexible cable section comprising:
   one or more wire conductors operable to carry electronic signals to and from the outside plant equipment;
   an intermediate layer of corrugated material substantially surrounding and encasing a length of the one or more wire conductors;
   a sheath of braided material substantially surrounding and encasing a length of the intermediate layer of material, wherein the braided material is substantially flexible, substantially shields against electromagnetic interference, and diffuses tensile forces experienced by the cable, thereby protecting the one or more wire conductors; and
   an exterior layer of substantially moisture-proof material substantially surrounding and encasing a length of the sheath of braided material.

2. The cable as set forth in claim 1, wherein the outside plant equipment includes one or more electronic signal repeater cards housed in a telecommunications equipment enclosure.

3. The cable as set forth in claim 1, wherein an interior space of the cable section is pressurized.

4. The cable as set forth in claim 1, wherein the intermediate layer of corrugated material is moisture-proof tubing material.

5. The cable as set forth in claim 1, wherein the exterior layer of substantially moisture-proof material is a shrinkable tubing material.

6. The cable as set forth in claim 1, further including a cable interface portion adapted to couple the cable section with an existing prior art cable section having a sheath of solid material, wherein the solid material substantially shields against electromagnetic interference but is substantially inflexible.

7. The cable as set forth in claim 1, further including an enclosure interface portion adapted to removably couple the cable section with the outside plant equipment.

8. The cable as set forth in claim 1, wherein the one or more wire conductors are twisted to increase flexibility thereof.

9. A cable comprising:
   a first section including
      a first set of one or more wire conductors operable to carry electronic signals, and
      a sheath of solid, substantially inflexible material substantially surrounding a length of the one or more wire conductors and substantially shielding the conductors against electromagnetic interference; and
   a second section adapted for electrical coupling with the first section, the second section including
      a second set of one or more wire conductors operable to carry electronic signals,
      an intermediate layer of flexible, corrugated, and moisture-proof tubing material substantially surrounding and encasing a length of the second set of one or more wire conductors, wherein the corrugated material is operable to be bent in up to approximately 180°,
      a sheath of braided material substantially surrounding and encasing a length of the intermediate layer of corrugated, moisture-proof material, wherein the braided material is substantially flexible, substantially shields against electromagnetic interference, and diffuses tensile forces experienced by the cable section, thereby protecting the one or more wire conductors, and
      an exterior layer of substantially flexible, moisture-proof, and shrinkable tubing material substantially surrounding and encasing a length of the sheath of braided material.

10. The cable as set forth in claim 1, wherein the intermediate layer of corrugated material is operable to be bent up to approximately 180°.

* * * * *